3,705,095
PLURAL STAGE PLATINUM CATALYST REFORMING WITH RHENIUM IN THE LAST STAGE
Milton H. Dalson, Carl D. Keith, and William C. Pfefferle, all c/o Engelhard Minerals & Chemicals Corp., 497 Delancy St., Newark, N.J. 07105, and John Mooi, c/o Atlantic Richfield Company, 400 E. Sibley Blvd., Harvey, Ill. 60426
No Drawing. Filed Mar. 20, 1970, Ser. No. 21,549
Claims priority, application Canada, July 3, 1969, 58,402/69
Int. Cl. C10g 35/08, 39/00
U.S. Cl. 208—65    19 Claims

ABSTRACT OF THE DISCLOSURE

A process for reforming naphthene and paraffin-containing hydrocarbon feeds to increase their aromatic content is disclosed which involves the use of a series of catalytic reaction zones of which one of the first contains an alumina-supported, platinum group metal-containing catalyst which is substantially devoid of rhenium and which serves to dehydrogenate naphthenes, and one of the last of which zones contains an alumina-supported, platinum group metal and rhenium-containing catalyst which serves to dehydrocyclize paraffins.

---

The present invention is directed to the catalytic reforming of gasoline boiling range hydrocarbons. More particularly, this invention is concerned with the catalytic reforming in the presence of molecular hydrogen of naphthene and paraffin-containing hydrocarbon fractions boiling primarily in the gasoline or naphtha range, in a multiple, adiabatic, fixed bed catalyst conversion system employing both platinum group metal-alumina and platinum group metal and rhenium-alumina catalysts to improve the octane number of the feed.

In view of the endothermic nature of catalytic reforming reactions there is usually employed a series of adiabatic catalyst bed reactors in such operations. One method comprises preheating the naphtha charge to the desired inlet temperature, passing it to the first reactor, reheating effluent from the first reactor and passing it into the second reactor, and so on through the remaining reheaters and reactors of the series. The inlet temperatures of each of the reactors can be the same or different and they generally fall in the range of about 850 to 960° F. or more. The temperature drop exhibited in each of the series of catalyst beds progressively decreases in the direction of hydrocarbon flow. For instance, the temperature drop in the first reactor of a three reactor series usually ranges between about 50 to 150° F., whereas the temperature drop in the terminal reactor is generally about 25° F. maximum and the last reactor may be exothermic, especially in high octane-higher pressure operations, e.g., 325 p.s.i.g. or more. In these systems it is generally considered that in one or more of the reactors in the first part of the series, the predominant reaction is dehydrogenation, for instance, the conversion of naphthenes to aromaites, while in one or more of the reactors in the terminal part of the series a principal reaction is paraffin dehydrocyclization. It is also known that catalysts composed essentially of small amounts of a platinum group metal or both a platinum group metal and rhenium on a solid support can be used in such reforming operations.

The present invention is based on the use in at least one of the naphthene dehydrogenation zones of such reforming systems, of a catalyst having a platinum group metal as the essential promoting metal component, on alumina, for instance, the catalyst contains no significant amount of a rhenium component; and the use in at least one of the paraffin dehydrocyclization zones of a catalyst having both a platinum group metal and rhenium as the essential catalytic metals on an alumina support. When the reforming operation is conducted with these distinct catalysts in the separately designated reaction zones a highly advantageous yield-octane number-catalyst aging relationship is obtained.

In the operation of this invention the naphthene dehydrogenation reaction zones serve to convert naphthenes to aromatics and perhaps there is also a minor amount of paraffin dehydrogenation. In a given system there may be only a single naphthene dehydrogenation reaction zone, although the series of catalyst beds may have 2, 3 or even 4 of such zones with the number generally rising as the naphthene content of the feed increases. In the present invention the naphthene dehydrogenation zones employing the designated catalyst have an inlet temperature of at least about 820° F., and it is preferred that these zones include the first catalyst bed of the series which has an inlet temperature of at least about 820° F. Often the inlet temperatures for the naphthene dehydrogenation zones will be in the range of about 820 to 920° F., preferably about 840 to 890° F. In some reforming operations there may be provided a preliminary reactor in which the inlet temperature is less than about 820° F. and naphthene dehydrogenation may take place in this reaction zone. In such systems the heating of the feedstock is usually accomplished by indirect exchange, for instance, with the reformate product, rather than by a fired preheater. In the method of the present invention the designated platinum group metal catalyst having essentially no rhenium component is employed in at least one, e.g. the initial, and preferably all, of the naphthene dehydrogenation zones which have inlet temperatures of at least about 820° F. The catalyst in any lower temperature reactor may be selected according to the desires of the operator, but again is preferably a platinum group metal catalyst having essentially no rhenium component. By the term inlet temperatures, reference is made herein to the temperature of the initial portion of the catalyst in the reactor in question.

In a preferred operation the inlet temperatures to the naphthene dehydrogenation zones are in the range of about 820 to 920° F. for at least about 80% of the total reforming processing cycle. When there are at least two such naphthene dehydrogenation reactors, it is preferred that the inlet temperature of the first such reactor not exceed about 900° F. while the inlet temperature of the subsequent naphthene dehydrogenation reactors be maintained below about 920° F., for at least about 80% of the total reforming processing time. As a further refinement in this type of operation the total temperature drop in each of the naphthene dehydrogenation zones does not vary more than about 30° F. over at least about 80% of the total reforming cycle. The reforming system can be run so that there is about 75 to 95 weight percent conversion of naphthenes in the overall dehydrogenation zones which provides an effluent from the last-in-series naphthene dehydrogenation reaction zone having less than about 10 weight percent naphthenes. Frequently, the conditions in the naphthene dehydrogenation zones include pressures of about 50 to 500 p.s.i.g., preferably about 100 to 350 p.s.i.g., and weight hourly space velocities for the overall dehydrogenation reaction zones of about 0.5 to 4 WHSV.

As previously stated, at least one of the reactors in the terminal part of the series, and preferably at least the last reactor, employs a catalyst containing a platinum group metal and rhenium supported on alumina, and a principal reaction effected is the dehydrocyclization of paraffins to aromatics. There may be more than one of such paraffin dehydrocyclization reactors and each of such reactors has an inlet temperature of about 900 to 1000° F., preferably about 900 to 960° F. It is further preferred that such inlet temperatures be at least about 20° F. greater than the inlet temperaures of any of the napthhene dehydrogenation reactors for at least about 50% of the total reforming process time. Frequently, the inlet temperature of the last reactor of the series exceeds about 930° F. for at least about 25% of the total reforming cycle. The catalyst volume in the total naphthene dehydrogenation zones compared to that in all of the paraffin dehydrocyclization zones is often about 1:20 to 3:1; preferably this ratio is at least about 1:5 when the naphthene content of the gasoline or naphtha feed is at least about 30 volume percent, and the ratio is less than about 1:4 when the paraffin content of the gasoline or naphtha feed is at least about 60 volume percent. Although the system of this invention is described with reference to naphthene dehydrogenation reaction zones and paraffin dehydrocyclization reaction zones there may be other catalytic reactors in the series which are operated under conditions such that they do not fall in the category of the described naphthene dehydrogenation or paraffin dehydrocyclization zones.

During the reforming operation hydrogen is supplied to the reaction zones by recycle of hydrogen-containing gases separated from the product effluent. Although the total hydrogen gas stream which is recycled can be passed to the initial naphthene dehydrogenation reaction zone and thence throughout the series of reactors, it is preferred that only a portion of the recycle gases go to the naphthene dehydrogenation reaction zones with there being separate hydrogen gas introduction to the paraffin dehydrocyclization zones. Thus, there may be provided about 0.5 to 8 moles, preferably about 1 to 6 moles, of hydrogen recycle gas per mole of hydrocarbon introduced into the initial naphthene dehydrogenation zone which has an inlet temperature of about 820° F., while there is passed directly to the paraffin dehydrocyclization zones sufficient hydrogen gas to give in such zones about 7 to 30 moles, preferably about 8 to 20 moles, of total hydrogen recycle gas per mole of hydrocarbon passing into the paraffin dehydrocyclization zones. Of course, the total gas to such dehydrocyclization zones includes that coming from the preceding reactors as well as any portion of recycle gas passed directly into the paraffin dehydrocyclization zones. The latter addition, that is, the direct charging of recycle gas to the paraffin dehydrocyclization zones, is usually at least about 3 moles of hydrogen recycle gas, preferably at least about 5 moles, per mole of hydrocarbon passing into such zones.

As a further modification of the present invention, the catalysts in one or more of the paraffin dehydrocyclization zones, which catalysts contain both platinum group metal and rhenium, are more effective in performing their desired functions by providing in such reaction zones during the hydrocarbon processing period a small, catalyst-enhancing amount of a chloriding agent along with a small amount of water vapor. Accordingly, there is charged, either separately or in one or more of the other materials passing to any one or more of the such reaction zones, the small amount of an agent which under the conditions of operation affords chlorine (Cl). Such amounts often include about 0.1 to 100 parts per million (p.p.m.) preferably about 1 to 40 p.p.m. of chlorine (Cl) based on the weight of the hydrocarbon of gasoline boiling range charged. At the same time the water content in the total charge to the reaction zone receiving the chloriding agent is about 10 to 1000 p.p.m. by weight, preferably about 10 to 100 p.p.m., based on the hydrocarbon feed of gasoline boiling range charged. The length of time of the chlorine and water vapor contact of the catalyst can be as long as desired and it is preferred that the amount of chlorine added be such that excessive hydrocracking to produce $C_1$ to $C_3$ hydrocarbon gases does not result. For instance, amounts of chlorine added in excess of about 2 weight percent based on the catalyst may cause too much light hydrocarbon production. Enough chloriding agent can be added to supply at least about 0.2, or preferably at least about 0.4, weight percent chlorine based on the catalyst. The chlorine addition can be effected one or more times during a given hydrocarbon processing period between catalyst regenerations or replacement. Also, the chloride content of the catalyst in a reactor receiving chlorine may advantageously be about 0.9 to 2 weight percent after the chlorine addition, while the chloride content of the catalyst in the other reactors of the system is about 0.3 to 0.7 weight percent. It is preferred to apply the chloriding treatment when the catalyst support has a surface area of up to about 250 to 300 square meters per gram. At such time the chloride content of the catalyst is often about 0.1 to 0.4 weight percent and at least 0.2% lower than the virgin catalyst. By operating according to this invention the desired improvements in catalytic properties and process results can be obtained not only during the actual chloride addition but also during the subsequent hydrocarbon processing period.

Molecular chlorine or a variety of chlorine-containing compounds can serve as the source of chlorine in the process of this invention as long as the compounds are essentially in the vapor state under processing conditions. From a handling and measuring standpoint normally liquid, chlorine-containing agents are preferred, for instance, carbon tetrachloride. Other chlorine-containing compounds which can be employed in the method of this invention include methylchloride, trichloroethylene, ethylenedichloride, and other chlorine-containing compounds which decompose under reforming conditions. Often when the chlorine-containing compound is organic it has from 1 to 3 carbon atoms.

One of the catalysts employed in the process of the present invention contains as promoters small, catalytically-effective amounts of each of a platinum group metal and rhenium supported on an essentially alumina base which may contain minor amounts of other components. The platinum group metal and rhenium are each often about 0.05 to 3 weight percent of the catalyst, preferably about 0.1 or 0.3 to 1 weight percent. Platinum is the most preferred metal in such catalysts but other platinum group metals such as palladium and rhodium can be used. When the catalyst is in a virgin state the promoting metals are preferably for the most part undetectable by X-ray diffraction analysis, which indicates that if the metals are present in the catalyst as elemental metals or alloys their crystallite sizes are less than about 50 A. A common method of providing the platinum group metal in the catalyst is by contact of the support, either in hydrous or in calcined form, with an aqueous solution of a chlorine-containing compound, for instance chloro-platinic acid. In this manner chlorine is incorporated in the catalyst in amounts of, for instance, about 0.2 to 2 weight percent, preferably about 0.3 to 1 weight percent. Such amounts of chlorine component can also be provided in the catalyst from a source other than the compound supplying the platinum group metal. Rhenium can also be added to the hydrous or calcined support through contact with an aqueous solution of a rhenium compound, e.g. perrhenic acid or ammonium perrhenate. If promoting metal is added to a calcined support, the resulting composite is generally recalcined.

The catalysts which can be used in one or more or all of the naphthene dehydrogenation zones and even in all but one paraffin dehydrocyclization reactor of the system, contain a platinum group metal on an alumina support and have an essential absence of rhenium, e.g. less than about 0.05 weight percent, or less than about 0.01 weight percent, or even no detectable amount, of rhenium. As stated above, it is preferred that these catalysts, with can be designated as non-rhenium catalysts, be used in all reaction zones except the paraffin dehydrocyclization zones. These non-rhenium catalysts can be of the types of the platinum group metal and rhenium-containing catalysts described above, but without any significant addition of rhenium.

The supports in both types of catalysts of the present invention often have surface areas of at least about 150 square meters per gram and are preferably composed to a major extent of gamma-family alumina modifications derived by the activation or calcination of alumina trihydrates. These gamma-family alumina modifications include among others, gamma and eta aluminas, U.S. Pat. No. 2,838,444 discloses this type of alumina support having surface areas in the range of about 350 to 550 square meters per gram, while in U.S. Pat. No. 2,838,445 there is described catalyst supports made from predominantly trihydrate alumina precursors, the supports having surface areas in the range of about 150 to 350 square meters per gram. These supports are suitable for use in the present invention, especially the higher area supports of Pat. 2,838,444 which supports during use may have their surface areas reduced to about 150 to 250 square meters per gram. As stated, the preferred alumina precursors predominate in trihydrate which may contain one or more of the bayerite, gibbsite or nordstrandite (previously called randomite) forms, and preferably a major amount of the trihydrate is composed of bayerite or nordstandite which when calcined can form eta alumina. It is also advantageous that the hydrous alumina precursor contain about 65 to 95% of the trihydrate with the essential balance being composed of one or both of the alumina monohydrate, boehmite, or amorphous hydrous alumina. Preferred supports have pore volumes of at least about 0.1 cc./gm., preferably at least about 0.15 cc./gm., in pores greater than about 100 A. radius. It is also preferred that the supports have at least about 0.05 cc./gm. in pores greater than about 300 A. or even greater than about 600 A. radius. These determinations are by the method described by Barrett, Joyner and Halenda, JACS, 73 p. 373 (1951).

The gamma-family alumina modifications which can be referred to as activated forms of alumina result from the calcination, preferably in an oxygen-containing gas, of the hydrous alumina precursor. Calcination of the catalysts used in this invention can be conveniently conducted at temperatures of the other of about 700 to 1200° F. or more and this operation can be controlled to give a final catalyst of desired surface area. At an appropriate stage in the manufacture of the catalysts, the particles can be formed into macrosize as distinguished from finely divided or fluidized catalyst types. The macrosize particles frequently have diameters in the range of about $1/64$ to $3/8$ inch, preferably about $1/16$ to $1/4$ inch, and if not spherical, the particles usually have lengths of about $1/64$ to 1 inch or more, preferably about $1/8$ to $1/2$ inch.

The process of this invention involves hydrocarbon reforming conducted at elevated temperatures up to about 1000° F., and under a reducing atmosphere provided by the presence of a molecular hydrogen-containing gas. The feedstocks include gasoline boiling range hydrocarbons whether they boil over a broad or narrow temperature range. In such operations a naphtha, a fraction thereof or other similar boiling range hydrocarbons whose aliphatic and cycloaliphatic constituents are for the most part saturated and which may contain some aromatics, is converted to a product having greater aromaticity and higher octane rating. Relatively pure aromatics can be separated from the products. The feeds employed in the process of the invention include naphthas composed of at least about 15 up to about 70% (by volume) naphthenes and at least about 25% paraffins and have clear or unleaded research octane ratings (RON) in the range of about 30 to 60. Advantageously, the total hydrocarbon feed and recycle gas passing to a given reactor of the invention contain less than about 10 p.p.m. (by weight) sulfur, and preferably less than about 5 p.p.m. combined nitrogen and less than about 30 p.p.m. water. Superior operation can be provided where the hydrocarbon feed and recycle gas streams to all reactors have less than about 5 p.p.m. sulfur, and preferably less than about 10 p.p.m. water and less than about 2 p.p.m. combined nitrogen. These impurity levels are based on the total process materials passing to a given reactor.

The reforming systems are usually conducted at processing conditions which include reactor inlet temperatures of about 825 to 975 or 1000° F., and total pressures of about 50 to 600 p.s.i.g., preferably about 100 to 350 p.s.i.g. During the operation hydrogen-containing effluent gas is recycled to the reaction system, the latter having a series of adiabatic fixed bed catalyst reactors each being preceded by a feed heater. The recycle gas ratio is usually such to provide about 3 to 30 moles of hydrogen gas per mole of hydrocarbon feedstock. Also the hydrocarbon charge is often passed to the reactor system at a rate such that the overall space velocity is about 0.5 to 15 WHSV (weight of hydrocarbon per weight of catalyst per hour) preferably about 1 to 10 WHSV. The severity of the reaction conditions are such that the normally liquid reformate or product from the terminal reactor has a RON of at least about 90 or even at least about 95 or 100.

Carbonaceous deposits accumulate on the catalysts of this invention as reforming proceeds, and as a result the catalysts lose activity which can be counteracted by increasing the reaction temperature. Eventually however, when the reactor inlet temperatures reach a desired maximum, for instance, in the range of about 950 to 1000° F., especially at about 970° F. and above, it becomes inadvisable to increase the temperature further, otherwise undue aging of the catalysts may result. The catalysts can then be regenerated by carbon burn-off which improves the catalytic characteristics sufficiently for the catalysts to be reused on an economic basis.

At the beginning of regeneration the carbon content of the catalysts is generally above about 0.5 weight percent, often greater than about 10 weight percent. During regeneration of the catalysts by burning, the carbon level is often reduced to below about 0.5 weight percent, preferably below about 0.2 weight percent. This burning is conducted through contact of the catalysts with an oxygen-containing gas and generally the amount of oxygen is controlled to maintain the temperature of the catalysts from about 700 to about 900 or 1000° F., preferably in the temperature range of about 700 to 850° F. The pressure maintained during burning is preferably elevated, for instance is about 50 to 500 p.s.i.g. The controlled burning is usually initiated with an inert gas, e.g. nitrogen, carbon dioxide or their mixtures, containing a small amount of oxygen, for instance, up to about 1 mole percent and preferably with an oxygen partial pressure of at least about 0.2 p.s.i.a. When the bulk of the carbon has been removed from the catalysts by a gas containing the relatively low concentration of oxygen, the amount of oxygen can be increased somewhat to insure that sufficient carbon has been removed from the catalysts without exceeding the desired temperature. This type of treatment is exemplified by one or more burns-through of the catalyst beds at about 800° F. to 850° F., and about 100 to 500 p.s.i.g., with a gas containing above about 0.5 to about 3 or somewhat greater mole percent oxygen. Other suitable carbon-burning procedures can be employed as long as the temperatures are controlled and the carbon level of the catalysts is adequately lowered. During carbon burn-off and subsequent treatment of the catalysts with an oxygen-containing or other gas at elevated temperatures, the gas should be dry enough to avoid undue additional sintering of the catalysts and loss of surface area. Such loss generally increases as temperature, water content of the gas or treating time is raised.

Especially where the crystallite size of the promoting metals on the catalysts is to be reduced, the catalysts can, after carbon burn-off, be contacted with an oxygen-containing gas at a temperature of about 800 to 1000°

F., preferably about 850 to 950° F., and, if desired, an elevated pressure such as about 100 to 500 p.s.i.g. This treatment has sometimes been referred to in the art as an air soak and the oxygen content of the gas is usually greater than that present in the gas employed for carbon burn-off. Thus, the oxygen content of the gaseous stream employed for air soaking is often at least about 5 mole percent with there having been found no particular reason for increasing the gas content above about 20 mole percent. The air soaking period is generally at least about one hour and is usually continued for several hours, for instance, in the range of about 5 to 24 hours. Regeneration and air soaking procedures suitable for the catalysts of the present invention are disclosed in U.S. Pat. No. 2,922,766, herein incorporated by reference.

The virgin catalysts of this invention or used catalysts of such type, say after regeneration with or without reactivation, can be reduced by contact with a gaseous stream which contains molecular hydrogen. The treatment is at an elevated temperature, for instance, about 600 to 1000° F., preferably about 750 to 950° F. Elevated pressures are preferably used in the reduction and can be, for example, about 20 to 600 p.s.i.g., preferably about 50 to 350 p.s.i.g. Apparently, the reduction converts the catalytic promoting metals to their elemental state, but if a vaporous sulfiding agent be present some or all of the promoting metals may be converted to sulfide form. By using an essentially hydrocarbon-free gas during the reduction, hydrocracking is avoided as are its attendant disadvantages of, for instance, excessive catalyst temperature rises and the formation of catalyst poisons or deleterious agents such as carbon monoxide which can cause undesirable crystallite growth of the catalytic promoting metals. Also, carbon monoxide, for example, can interact with the catalytic promoting metals causing deactivation. The gas stream employed during reduction as often composed of about 70 to 100 volume percent hydrogen, preferably about 95 or 99 to 100 volume percent with any remaining components being up to about 30 volume percent of inert gas such as nitrogen. The gas advantageously contains less than about 1 volume percent hydrocarbons, preferably less than about 0.1%.

To avoid undue hydrocracking of the hydrocarbon feedstock during the initial period of hydrocarbon processing after the catalysts of the present invention are placed on-stream, the catalysts can be contacted with a gas containing sulfur-providing component in vaporous form. This sulfiding treatment can be conducted simultaneously with or subsequent to the reduction. If sulfiding is conducted simultaneously with the reduction a non-carbonaceous sulfur compound should be used due to the presence of oxygen in the system and to avoid any localized overheating of the catalyst. Suitable sulfur-providing materials or sulfiding agents include $SO_2$ and $H_2S$, preferably the latter. The amount of sulfiding agent employed is at least about 25% or even at least about 50% of the stoichiometric amount needed to give one atomic weight of sulfur for each atomic weight of total platinum group metal and rhenium in the catalyst, preferably the amount is at least about 50% to say up to about 500% or more. The sulfiding operation can be done at an elevated temperature, e.g. about 650 to 950° F., and at any suitable pressure, preferably an elevated pressure such as about 100 to 500 p.s.i.g. The sulfiding gas is reductive and usually contains a minor amount of the sulfur-bearing component, e.g. about 0.1-10 volume percent, preferably about 0.5 to 3%, with the major component being hydrogen or an inert gas such as nitrogen. Also the sulfiding agent can be added to the inlet of each reactor of the hydrocarbon processing system to minimize contact with other equipment surfaces where corrosion might occur. When the sulfiding is conducted simultaneously with or subsequent to reducing the catalysts with hydrogen, the catalysts are in sulfided form when they first contact the hydrocarbon being processed which avoids excessive hydrocracking with its attendant yield and selectivity losses.

It can be further advantageous in minimizing hydrocracking caused by the reduced catalysts whether presulfided or not, to supply vaporous sulfiding agent to the conversion system when charging of the hydrocarbon feedstock is begun. Thus, a small amount of the sulfiding agent, sufficient to significantly reduce hydrocracking during the initial portion of the processing cycle, can be added to the system. The sulfiding agent can conveniently be charged with the recycle gas or with the hydrocarbon stream. The amounts of sulfiding agent employed include about 1 to 500 p.p.m. by volume based on the hydrogen passing to the reaction system, preferably about 5 to 200 p.p.m. This sulfiding agent addition can be continued as long as the operator desires but often the addition will approximate the time period in which, in the absence of the sulfiding agent addition, the catalysts would cause significantly excessive hydrocracking. Hydrocracking can be detected in the processing system by any desirable means such as a drop in the hydrogen content of the off-gases or a temperature rise in the catalyst beds. The period of sulfiding agent addition upon placing the reduced catalysts back on processing can include, for instance, about 1 to 60 or more days and is often about 3 to 10 days.

The present invention will be further illustrated by the following examples.

A 20,000 BPSD naphtha reforming operation is carried out in a four reactor system employing a straight run naphtha feed containing approximately 45% naphthenes, approximately 40% paraffins and approximately 15% aromatics. The naphtha feed has an RON of 40, a boiling range of 150° F. to 380° F., less than about 5 p.p.m. $H_2O$, less than about 4 p.p.m. S, less than about 2 p.p.m. N, and less than about 1 p.p.m. Cl. The naphtha feed in admixture with 3 moles of hydrogen-containing recycle gas is heated to temperatures of about 890° F., and passed to the initial reactor. The reactor system is at a pressure of about 250 p.s.i.g. The first reactor, as well as each of the next two reactors, contains a fixed bed of platinum on alumina (about 0.6% Pt) catalyst. The fixed bed catalyst in the last reactor contains about 0.6% Pt and 0.6% Re on alumina.

Both catalysts are 1/16" extrudates having an alumina base of the type disclosed and claimed in U.S. Pat. 2,838,444. The alumina is derived from a hydrous alumina mixture having about 75% trihydrate which is predominantly bayerite and nordstrandite, the essential balance of the hydrous alumina being boehmite and amorphous hydrous alumina. The catalysts in the calcined, virgin state have surface areas of about 400 to 550 square meters per gram and chloride contents of about 0.7 weight percent derived from the use of chloroplatinic acid as the source of platinum.

The catalyst-reactor distribution is 1:1:1:3 by volume and the overall weight hourly space velocity is 2.0. The effluent of the first reactor which is at a temperature about 120° F. lower than the inlet temperature is heated to 900° for charging to the second reactor. The temperature of the effluent from the second reactor is about 95° F. lower than the inlet temperature, and the effluent is heated to 915° F., prior to being introduced into the third reactor. Effluent from the third reactor is at a temperature about 50° F. lower than the inlet temperature of the reactor. This effluent, containing about 5% by weight naphthenes, is combined with the remainder of the hydrogen-containing gas. The combined feed and recycle gas are then heated to a temperature of 965° F., prior to introduction into the fourth reactor where the reforming is completed. The naphthene content of the third reactor effluent of about 5% represents a conversion of naphthenes to aromatics in the first three reactors of about 80%. Hydrogen and light gases, including hydrocarbon gases such as methane, ethane and propane are separated from the the $C_5$+liquid reformate of 98 Research Octane Number (clear). A portion of hydrogen and light hydrocarbon gases is recycled and can be treated for removal of sulfur, nitrogen and water. The gas is then repressured to about 300 p.s.i.g. The repressured recycle gas is split into two streams on the basis of about 3 moles of gas per mole of fresh naphtha for mixing with the incoming fresh naphtha. The second stream of recycle gas is combined with the third reactor effluent at a recycle rate of about 9 moles of gas per mole of naphtha feed (total recycle: 12 moles of gas per mole of feed).

During the processing cycle the inlet temperature of the last reactor is periodically raised to maintain a yield of 98 RON reformate. The inlet temperatures of the first three reactors are periodically raised by 10° F., 10° F., and 5° F., respectively, to prevent change in the temperature drop in each of these reactors from varying more than approximately 7° F. in each reactor. Typical inlet temperatures of the reactors at the end of the processing cycle of the respective reactors are 900° F., 910° F., 920° F., 1000° F., for the first, second, third and fourth reactors, respectively.

This reforming operation is repeated under the same conditions, except that 25 p.p.m. chloride (as $CCl_4$) and 50 p.p.m. $H_2O$, both amounts being based on hydrocarbon feed boiling in the gasoline range, are added to the processing stream passing to the last reactor. The recycle gas stream passing to the initial reactor is contacted with bauxite to remove chlorine and then with crystalline aluminosilicate of 4 A. size to reduce the water content to less than 5 p.p.m. After 4 days of operation with the $CCl_4$ and $H_2O$ being controlled at these levels, the reforming operation produces gasoline of significantly higher octane than just before the chloriding was begun. Rather than produce the higher octane product, the reactor temperature inlets could be dropped to give a better yield at 98 RON than during the period immediately prior to the chloriding treatment.

It is claimed:

1. In a method of reforming naphthene and paraffin-containing petroleum hydrocarbons of gasoline or naphtha boiling range in the presence of molecular hydrogen wherein is employed in series a plurality of catalytic reaction zones to provide reformates of at least about 90 RON and hydrogen-containing recycle gas, the improvement which comprises providing at least one naphthene dehydrogenation zone in the early portion of said plurality of reaction zones, said naphthene dehydrogenation zone having a catalyst consisting essentially of platinum group metal and alumina and having an essential absence of rhenium, and at least one paraffin dehydrocyclization zone in a latter portion of said plurality of reaction zones, said paraffin dehydrocyclization zone having a catalyst consisting essentially of platinum group metal, rhenium and alumina, introducing hydrocarbon of gasoline or naphtha boiling range into such naphthene dehydrogenation zone at an inlet temperature of at least about 820° F., passing effluent from said naphthene dehydrogenation zone serially through the reaction zones to said paraffin dehydrocyclization zone, the inlet temperature of such paraffin dehydrocyclization zone being about 900 to 1000° F. and controlled to give a reformate of at least about 90 RON.

2. The method of claim 1 wherein the platinum group metal of the catalysts is platinum.

3. The method of claim 2 wherein the alumina of the catalysts is derived by calcination of hydrous alumina predominating in trihydrate.

4. The method of claim 1 wherein there is provided in said paraffin dehydrocyclization zone a vaporous chlorine-containing agent in an amount to supply about 0.1 to 100 p.p.m. chlorine based on the weight of said hydrocarbon feed, while providing in said paraffin dehydrocyclization zone about 10 to 1000 p.p.m. $H_2O$ based on the weight of hydrocarbon of gasoline boiling range charged to said zone.

5. In a method of reforming naphthene and paraffin-containing petroleum hydrocarbons of gasoline or naphtha boiling range in the presence of molecular hydrogen and supported platinum group metal reforming catalyst wherein is employed in series a plurality of catalytic reaction zones, each of said plurality of zones being preceded by heating means for the hydrocarbon processed and molecular hydrogen, to provide reformates of at least about 90 RON and hydrogen-containing recycle gas, the improvement which comprises providing at least one naphthene dehydrogenation zone in the early portion of said plurality of reaction zones, said naphthene dehydrogenation zone having a catalyst consisting essentially of platinum group metal and alumina and having an essential absence of rhenium, and at least one paraffin dehydrocyclization zone in a latter portion of said plurality of reaction zones, said paraffin dehydrocyclization zone having a catalyst consisting essentially of platinum group metal, rhenium and alumina, introducing said hydrocarbon of gasoline or naphtha boiling range containing at least about 15% by volume of naphthenes and at least about 25% by volume of paraffins into such naphthene dehydrogenation zone at an inlet temperature of about 820 to 920° F. for at least about 80% of the total reforming process time while passing a portion of said recycle gas to such naphthene dehydrogenation zone at a rate of about 0.5 to 8 moles of recycle gas per mole of hydrocarbon feed and for a reaction time sufficient to provide a conversion of naphthenes to aromatics of about 75 to 95% and an effluent from the last such naphthene dehydrogenation zone having less than about 10% by weight naphthenes, passing effluent from said naphthene dehydrogenation zone serially through the reactors to said paraffin dehydrocyclization zone, the inlet temperature of such paraffin dehydrocyclization zone being about 900 to 1000° F. and controlled to give a reformate of at least about 90 RON, said dehydrocyclization zone inlet temperature being at least 20° F. greater than the inlet temperature of the first naphthene dehydrogenation zone for at least about 50% of the total reforming process time, while passing a portion of the hydrogen-containing recycle gas to such paraffin dehydrocyclization zone at a rate such that the total gas recycle to the paraffin dehydrocyclization zone is about 7 to 30 moles of said recycle gas per mole of feed, said portion of hydrogen-containing recycle gas to said paraffin dehydrocyclization zone being at least a third of the total hydrogen-containing recycle gas recycled, the catalyst volume distribution of the naphthene dehydrogenation zones to the paraffin dehydrocyclization zones being between about 1:20 to 3:1 and maintaining such zones under endothermic conditions.

6. The method of claim 5 wherein the platinum group metal of the catalysts is platinum.

7. The method of claim 6 wherein the alumina of the catalysts is derived by calcination of hydrous alumina predominating in trihydrate.

8. The method of claim 6 wherein the inlet temperature of the naphthene dehydrogenation zone is about 840 to 890° F.

9. The method of claim 8 wherein the mole ratio of hydrogen-containing recycle gas to hydrocarbon in the naphthene dehydrogenation zone is about 1 to 6:1 and the mole ratio of hydrogen-containing recycle gas to hydrocarbon in the paraffin dehydrocyclization zone is about 8 to 20:1.

10. The method of claim 1 wherein the sulfur content of the total hydrocarbon feed and recycle gas passing to said naphthene dehydrogenation zone is less than about 10 p.p.m.

11. The method of claim 10 wherein the impurity levels of both the hydrocarbon feed and recycle gas are below about 10 p.p.m. water, 5 p.p.m. sulfur, and 2 p.p.m. combined nitrogen.

12. The method of claim 10 wherein there is provided in said paraffin dehydrocyclization zone a vaporous chlorine-containing agent in an amount to supply about 0.1 to 100 p.p.m. chlorine while providing in said paraffin dehydrocyclization zone about 10 to 1000 p.p.m. $H_2O$, said amounts being based on the weight of hydrocarbon of gasoline boiling range charged to said zone.

13. The method of claim 12 wherein the alumina of the catalysts is derived by calcination of hydrous alumina predominating in trihydrate.

14. The method of claim 13 wherein the impurity levels of both the hydrocarbon feed and recycle gas are below about 10 p.p.m. water, 5 p.p.m. sulfur, and 2 p.p.m. combined nitrogen.

15. The method of claim 5 wherein the sulfur content of the total hydrocarbon feed and recycle gas passing to said naphthene dehydrogenation zone is less than about 10 p.p.m.

16. The method of claim 15 wherein the platinum group metal of the catalysts is platinum.

17. The method of claim 16 wherein the alumina of the catalysts is derived by calcination of hydrous alumina predominating in trihydrate..

18. The method of claim 4 wherein the sulfur content of the total hydrocarbon feed and recycle gas passing to said naphthene dehydrogenation zone is less than about 10 p.p.m.

19. The method of claim 18 wherein the platinum group metal of the catalysts is platinum.

References Cited

UNITED STATES PATENTS

| | | | |
|---|---|---|---|
| 3,287,253 | 11/1966 | McHenry et al. | 208—65 |
| 3,415,737 | 12/1968 | Kluksdahl | 208—139 |
| 3,392,107 | 7/1968 | Pfefferle | 208—65 |
| 3,436,335 | 4/1969 | Maziuk | 208—65 |
| 3,556,985 | 1/1971 | McCoy | 208—138 |
| 2,838,444 | 6/1958 | Teter et al. | 208—138 |
| 2,838,445 | 6/1958 | Teter et al. | 208—138 |

HERBERT LEVINE, Primary Examiner

U.S. Cl. X.R.

208—138